(12) United States Patent
Pizzi

(10) Patent No.: US 6,864,977 B2
(45) Date of Patent: Mar. 8, 2005

(54) SPECTROPHOTOMETER WITH ELECTROSTATIC-FILM SHUTTER

(75) Inventor: Marco Pizzi, Turin (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 0 days.

(21) Appl. No.: 10/460,255

(22) Filed: Jun. 13, 2003

(65) Prior Publication Data
US 2004/0017566 A1 Jan. 29, 2004

(30) Foreign Application Priority Data
Jul. 26, 2002  (IT) ..................................... TO2002A0669

(51) Int. Cl.$^7$ ................................................. G01J 3/42
(52) U.S. Cl. ........................ 356/319; 359/230; 359/232
(58) Field of Search .......................... 356/319; 359/230, 359/232

(56) References Cited

U.S. PATENT DOCUMENTS

| 3,659,942 | A | * | 5/1972 | Vergato ....................... 356/325 |
| 4,070,112 | A | | 1/1978 | Tsunazawa et al. |
| 4,483,590 | A | * | 11/1984 | Moss .......................... 356/334 |
| 5,477,321 | A | * | 12/1995 | Johnson ....................... 356/325 |
| 6,020,958 | A | | 2/2000 | Tobe et al. |
| 6,236,491 | B1 | * | 5/2001 | Goodwin-Johansson .... 359/230 |
| 6,243,163 | B1 | * | 6/2001 | Wakabayashi et al. ...... 356/319 |
| 6,307,204 | B1 | * | 10/2001 | Kanomata et al. .......... 250/373 |
| 6,396,620 | B1 | * | 5/2002 | Goodwin-Johansson .... 359/230 |

FOREIGN PATENT DOCUMENTS

| EP | 1 008 885 A1 | 6/2000 |
| EP | 1 026 536 A1 | 8/2000 |
| EP | 1 243 902 A1 | 9/2002 |

* cited by examiner

Primary Examiner—F. L. Evans
Assistant Examiner—Kara Geisel
(74) Attorney, Agent, or Firm—Sughrue Mion, PLLC

(57) ABSTRACT

Described herein is a spectrophotometer having an inlet slit associated to which is at least one electrostatic-film shutter.

5 Claims, 2 Drawing Sheets

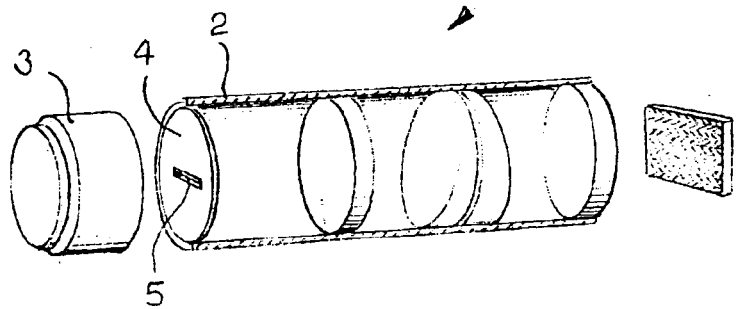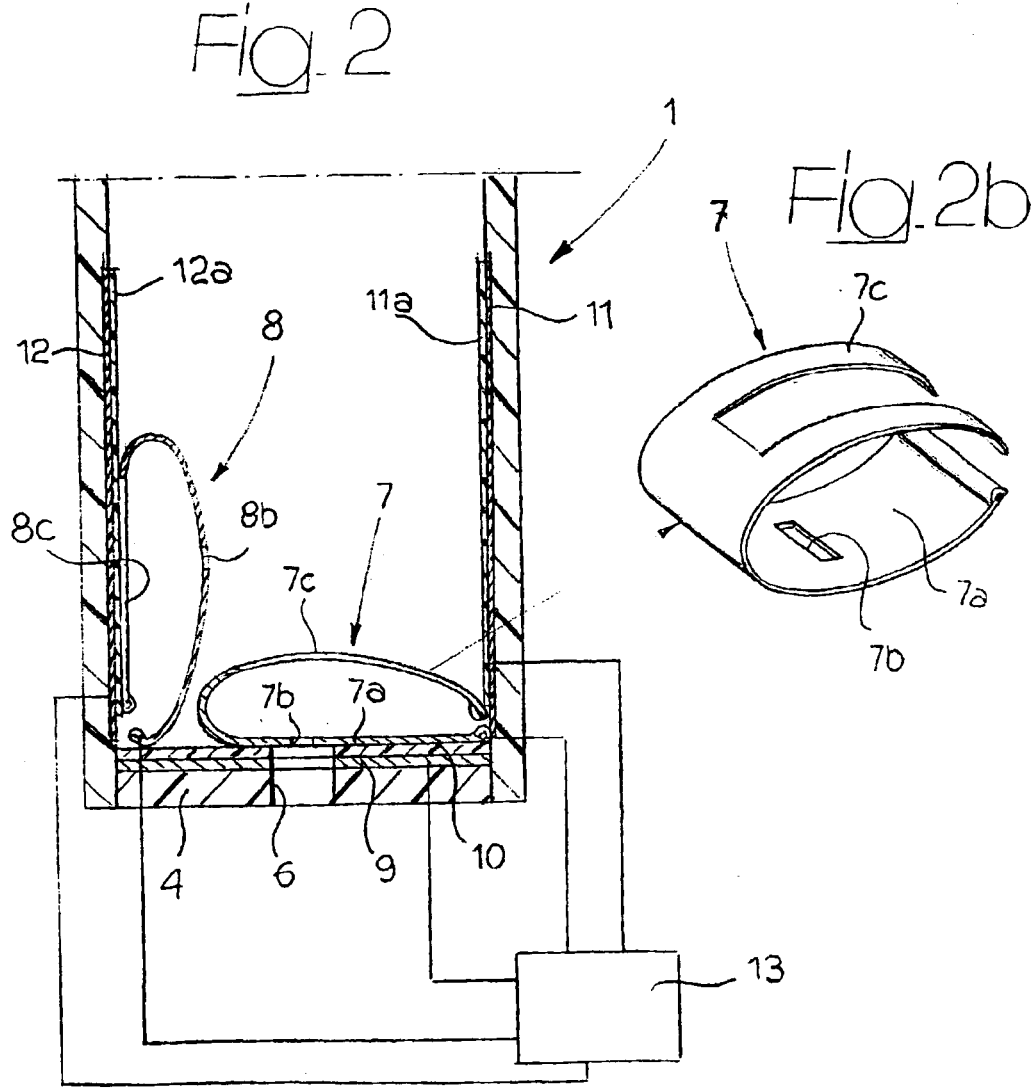

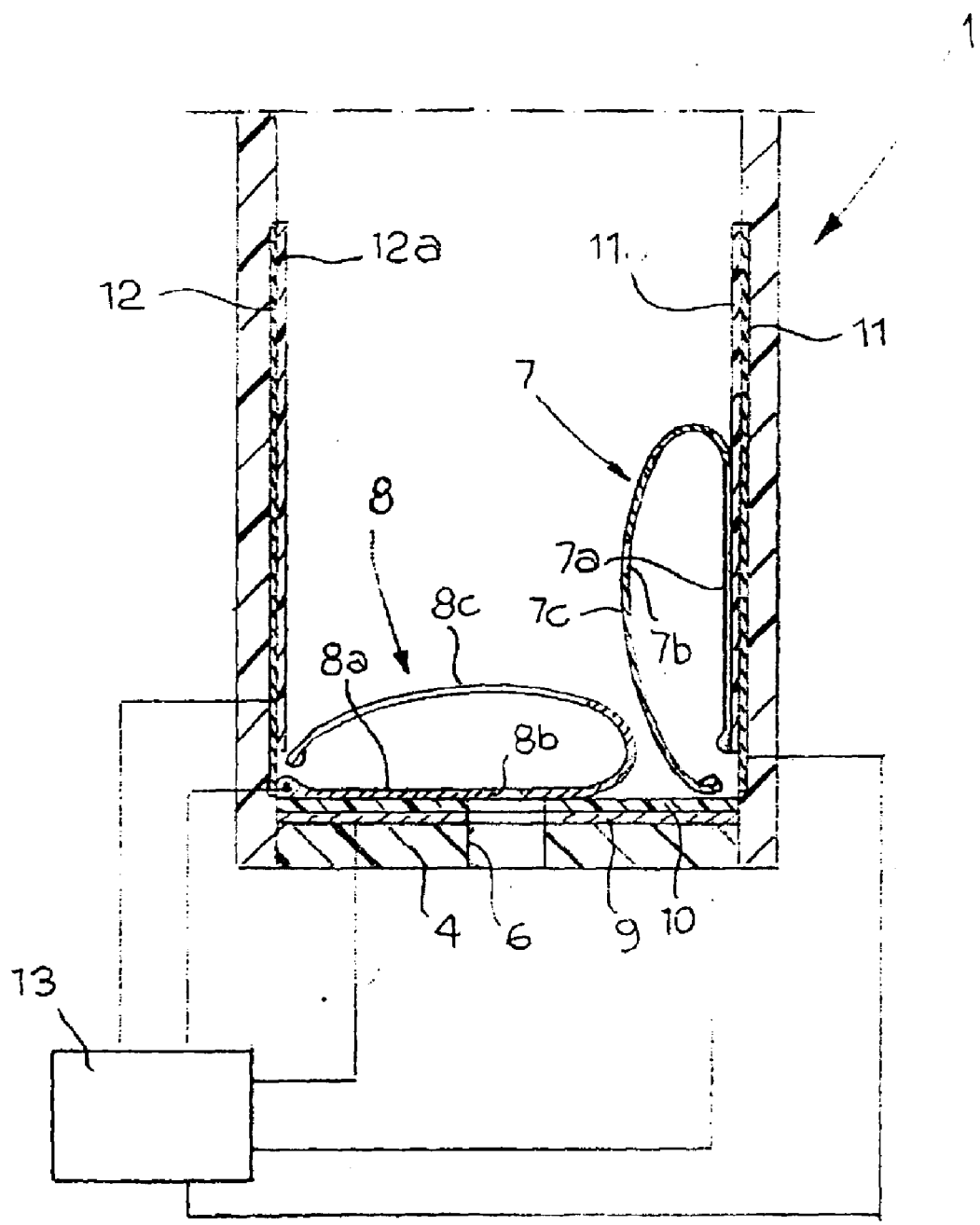

SPECTROPHOTOMETER WITH ELECTROSTATIC-FILM SHUTTER

BACKGROUND OF THE INVENTION

The present invention relates to spectrophotometers. Currently known spectrophotometers comprise a body having one end which is provided with a lens and with an inlet slit for passage of the light beam. The said slit is always open. It would, instead, be desirable to provide means enabling periodic closure of the inlet slit of the spectrophotometer.

The purpose of the present invention is to provide a spectrophotometer equipped with shutter means of an improved type which are designed to enable control of the inlet slit thereof.

SUMMARY OF THE INVENTION

In order to achieve the said purpose, the subject of the invention is a spectrophotometer of the type indicated above, characterized in that associated to the aforesaid inlet slit is an electrostatic-film shutter.

The technology of the electrostatic-film shutters has been studied and developed for some time by the present applicant. Examples of shutters of this kind are, for instance, illustrated in EP-A-1 026 536 and EP-A-1 008 885. One example of said shutters constituted by a film which, in the resting condition, tends to remain in a curled configuration, whereas, when it is activated, tends to unroll and to adhere by electrostatic effect on a substrate bearing a fixed electrode coated with a dielectric layer. The electrostatic film can be entirely made of conductive material, or else may be made of a plastic material bearing an electrical-conducting layer. The thicknesses of the electrostatic film and of the fixed electrode are of the order of microns. The said layers are obtained by means of techniques in themselves known, such as vapour deposition, spin-coating, dipping. If a voltage is applied between the fixed electrode and the electrostatic film, adhesion by electrostatic effect takes place. When the voltage is no longer applied, in the case of the example cited in which the film tends to assume a curled configuration in the resting condition, return to the curled configuration is due to the elasticity of the film itself. In other applications, the film is in the form of a strip wound in a closed loop and co-operates with two fixed electrodes which are selectively activated for recalling the electrostatic film towards one first position or towards one second position.

The idea underlying the present invention is that of applying the technology of the electrostatic films described above for the purpose of obtaining an shutter for the inlet slit of a spectrophotometer.

In a particularly preferred embodiment, in a position corresponding to the lens of the spectrophotometer, there may be provided two different electrostatic films which can be selectively activated so as to be brought into a position corresponding to the lens of the spectrophotometer and each have an opening in the form of a slit of different size. In this way, by activating one or the other electrostatic film, it is possible to obtain two different inlet slits for the spectrophotometer, according to the conditions of use. Of course, also the use of a third electrostatic film without any window, which can be activated whenever it is necessary to close the inlet of the spectrophotometer completely, is not ruled out.

BRIEF DESCRIPTION OF THE DRAWINGS

Further characteristics and advantages of the invention will emerge clearly from the ensuing description with reference to the annexed drawings, which are provided purely by way of non-limiting example and in which:

FIG. 1 is a perspective view of a spectrophotometer; and

FIGS. 2, 2b and 3 illustrate a cross-sectional view at an enlarged scale of a preferred embodiment of the spectrophotometer according to the invention, in two different operating conditions.

DETAILED DESCRIPTION OF THE INVENTION

With reference to FIG. 1, number 1 designates, as a whole, a spectrophotometer comprising a body 2, which is provided with the refractive elements for chromatic dispersion, and having at one end a lens 3 associated to an end wall 4 which is provided with an inlet window 5.

According to the invention, associated to the inlet window 5 is an electrostatic film of any type whatsoever, which can be activated for shutting the window 5 periodically.

FIGS. 2, 2b and 3 illustrate a preferred embodiment, in which the end wall 4 of the spectrophotometer bears an opening 6 on top of which there are selectively set two electrostatic films 7, 8 of the type wound in a closed loop. Each film, when activated, presents a continuous wall 7a, 8a which is provided with a slit 7b, 8b which sets itself on top of the opening 6 and defines the true inlet slit of the spectrophotometer. The slits 7b, 8b of the two films 7, 8 are of different size, so that it is possible to obtain an inlet slit of different size by activating one or the other of the two electrostatic films 7, 8. The rear part 7c, 8c of the two films 7, 8 is constituted only by two side strips, with a large central opening (see FIG. 2b) in such a way as not to interfere with the light beam which enters the spectrophotometer through the slit 7b or 8b.

Each of the two electrostatic films 7, 8 can be recalled by electrostatic effect against a fixed electrode 9, associated to the wall 4, which is coated with a dielectric layer 10, or against a fixed auxiliary electrode 11, 12 which is set in the wall of the spectrophotometer and is also coated with a dielectric layer 11a, 12a. Associated to the device are electronic means 13 for controlling application of a voltage between the fixed electrode 9 and the electrostatic film 7 when it is necessary to activate the latter, or else between the fixed electrode 9 and the electrostatic film 8, when it is, instead, necessary to activate the latter (FIG. 2). While one of the two films is active, the other film is recalled to the operative position by applying a voltage between the film itself and the corresponding auxiliary electrode. Thus, for example, in the case of FIG. 2, the film 8 is maintained in its inoperative position by applying a voltage between the film itself and the auxiliary electrode 12, whilst, in the case of FIG. 3, the electrostatic film 7 is maintained in its operative position by applying a voltage between the film 7 and the auxiliary electrode 11.

Of course, it would be possible to envisage a third electrostatic film similar to the film 7, 8 arranged in such a way as to move in a plane orthogonal to the plane of the figure, and designed to be activated for obstructing completely the inlet opening 6, when both of the electrostatic films 7, 8 are kept in their inoperative condition.

As has already been said, however, to the wall 4 which is provided with the slit at the inlet of the spectrophotometer there could be associated a single electrostatic film having the function of shutting said slit completely. For example, it would be possible to envisage a film made of a strip having an end anchored to the wall 4 and the opposite end free which tends to curl up in the resting condition and, instead, to be distended by electrostatic effect on the fixed electrode 9 in the activated condition.

Of course, without prejudice to the principle of the invention, the details of construction and the embodiments may be vary widely with respect to what is described and illustrated purely by way of example, without thereby departing from the scope of the present invention. For example, in the case in which there is a sufficient space, the film in its inoperative position may also roll up laterally on the same plane as that of the slit and not vertically as shown in the drawings.

What is claimed is:

1. A spectrophotometer, comprising a body which carries a lens with an inlet slit, wherein associated to said inlet slit is an electrostatic-film shutter, wherein the electrostatic film, or each electrostatic film, is in the form of a strip wound in a closed loop and co-operates with two fixed electrodes which can be selectively activated for recalling the electrostatic film to an active condition and to a resting condition, and wherein there are provided two electrostatic films which can be selectively activated so as to define slits of different size, each film having one wall which is provided with a respective inlet slit and one opposite wall which is defined by two side strips separated by a wide opening for the passage of the light beam which enters the spectrophotometer through the aforesaid inlet slit.

2. A spectrophotometer comprising a body (2) with an end wall (4) which carries a lens (3), said end wall (4) having a single inlet slit (5; 6), characterised in that associated to said inlet slit (5; 6) is an electrostatic-film shutter (7; 8) carried on the body (2) and movable between a rest position, in which the inlet slit is open, and an active position, in which said shutter (7; 8) covers said inlet slit, in that the electrostatic-film shutter comprises two electrically conductive thin films (7a, 8a) which are each able to adhere by electrostatic effect to a substrate (4) which carries a fixed electrode (9) coated with a dielectric layer (10), following upon application of a voltage between the fixed electrode and the electrostatic film, and in that means are provided to selectively activate said films (7a, 8a) so as to bring one or the other of them to cover said inlet slit (6), said two films (7a, 8a) having slits (7b, 8b) of a size different with respect to that of the inlet (6) of the spectrophotometer, so as to define a different inlet slit for the spectrophotometer, when activated.

3. The spectrophotometer according to claim 2, characterized in that each electrostatic film is constituted by a film having one end anchored to a substrate and the opposite end which, in the resting condition, tends to curl up and, in the activated condition, to extend over the substrate.

4. The spectrophotometer according to claim 2, characterized in that each electrostatic film is in form of a strip wound in a closed loop and co-operates with two fixed electrodes (9, 11; 12) which can be selectively activated for recalling the respective electrostatic film to an active condition and to a resting condition.

5. The spectrophotometer according to claim 4, characterized in that each film has one wall (7a, 8a) which is provided with a respective inlet slit (7b, 8b) and one opposite wall (7c, 8c) which is defined by two side strips separated by a wide opening for the passage of the light beam which enters the spectrophotometer to the aforesaid inlet slit.

* * * * *